Feb. 2, 1960   E. C. MOSS   2,923,884
PHASE MEASURING CIRCUIT
Filed May 24, 1956

INVENTOR.
Eugene Carl Moss
BY
ATTORNEY

United States Patent Office 2,923,884
Patented Feb. 2, 1960

2,923,884

PHASE MEASURING CIRCUIT

Eugene C. Moss, Philadelphia, Pa.

Application May 24, 1956, Serial No. 587,184

8 Claims. (Cl. 324—87)

(Granted under Title 35, U.S. Code (1952), sec. 266)

The invention described herein may be manufactured and used by or for the Government of the United States of America for governmental purposes without the payment of any royalties thereon or therefor.

The present invention relates generally to electronic measuring equipment and, more particularly, to a circuit for and a method of measuring the phase angle between a pair of signal voltages.

Conventional arrangements heretofore employed for determining the phase displacement between a reference voltage and a signal voltage have, for the most part, made use of the technique of first simultaneously adding and subtracting equal components of these voltages, then rectifying the resultant sum and difference voltages and thereafter oppositely applying these voltages to an RC network composed of a pair of equal magnitude series resistors having shunt capacitors, the magnitude of the output voltage developed across this RC network being a sine function of the phase angle between the voltages being compared. This method of phase detection, which is amplitude-sensitive, strictly requires equal amplitude reference and input signal voltages to satisfy the trigonometric identity for the sum and difference of these voltages.

It is accordingly a primary object of the present invention to provide a phase measuring circuit which can operate with unequal amplitude voltages.

A secondary object of the present invention is to provide a method for measuring the phase angle between a signal voltage and a reference voltage which is unaffected by an amplitude inequality between these voltages.

A further object of the present invention is to provide a phase measuring circuit which has a high degree of stability, ease of calibration, and does not shift the phase of the signal voltage being investigated.

A still further object of the present invention is to provide a phase detector which will give a high degree of accuracy when the amplitude of the reference signal is much greater than that of the signal voltage.

Briefly, and in general terms, the above objects of the invention are realized by making use of the fact that two voltages which are out of phase will pass through their zero amplitude points at different times and that one of these voltages can be employed as a switching signal as it passes through zero to transfer conduction in a diode bridge arrangement and reverse the sense of the output voltage at the particular time at which the signal voltage is out of phase with the reference voltage.

These and other objects of the invention will be more fully understood when considered in conjunction with the following specification and figures, of which:

Figure 1:
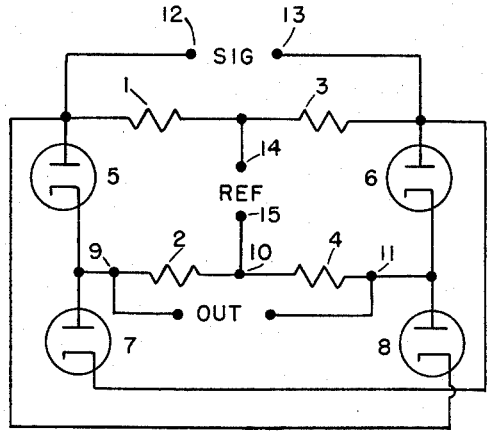
Fig. 1 is a schematic diagram of a phase measuring circuit embodying the present invention.

Referring to Fig. 1 of the drawings, a diode bridge made up by a pair of series diodes 5 and 7 and 6 and 8 is regulated by a reference voltage which is applied to terminals 14 and 15 and via resistors 1 and 2 to the anodes of diodes 5 and 7 and via resistors 3 and 4 to the anodes of diodes 6 and 8. The input signal, whose phase relationship with respect to the reference voltage is to be measured, is applied to terminals 12 and 13 across the series combination of resistors 1 and 3. The output from this bridge arrangement is taken across the series combination of resistors 2 and 4 at points 9 and 11.

Figure 2:
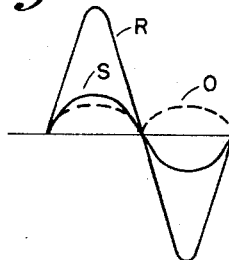
Fig. 2 illustrates the output wave form of the circuit of Fig. 1 when the reference and signal voltages are in phase.

The operation of this circuit will now be described in the particular case where the reference and signal voltages are in phase with signal input terminal 12 and reference terminal 14 taken as positive with respect to terminals 13 and 15, respectively. At the outset of this description, it should be remembered that the reference signal has an amplitude considerably greater than that of the signal voltage, this relationship being shown by Fig. 2, where reference character "R" identifies the reference voltage, "S" the signal voltage, and "O" the output voltage. With terminal 14 positive with respect to 15, diodes 5 and 6 will be in a state of conduction with the result that current will flow from terminal 14 of the reference voltage source through the parallel paths composed of resistors 1, diode 5, resistor 2, and resistor 3, diode 6, resistor 4. Since the parameters of this bridge are set so that resistors 1 and 3 and resistors 2 and 4 have equal values, the voltage drops across resistors 2 and 4 will be equal due to this current component and, as a consequence, points 9 and 11 will be at the same relative potential. The diode bridge balance is thus not disturbed by the above current flow. However, an additional component of current will flow at this time from terminal 12 of the signal source through diode 5, resistor 2, the internal impedance of the reference source which is relatively low being that demonstrated, for example, by a cathode follower connection, through resistor 3 back to terminal 13. No component of this current can flow through resistor 4 due to the poling of diode 6 and the nonconduction of diode 8. The bridge is thus unbalanced and an output voltage proportional to the magnitude of the signal voltage exists across resistor 2 with point 9 now positive with respect to point 11. The magnitude of this output voltage will follow that of the signal voltage, as shown by the dotted wave form in Fig. 2, and the former can be made to approach the latter in absolute value by having resistors 2 and 4 considerably greater than resistors 1 and 3, the voltage drop across the conducting diodes being relatively low and not appreciably influencing this result.

During the complementary negative half cycle of the reference and signal voltages, with point 15 now positive with respect to 14, diodes 5 and 6 are now nonconducting and diodes 7 and 8 conducting. Hence, current will flow from terminal 15 through the parallel paths composed of resistors 2, diode 7, resistor 3 and resistor 4, diode 8, resistor 1, back to terminal 14. Here, too, the currents through resistors 2 and 4 due to the reference signal are equal and, as in the previous half cycle, points 9 and 11 remain at the same relative potential. However, an additional component of current will flow from terminal 13 of the signal source through resistor 3, the interval impedance of the reference source, resistor 4, diode 8, back to terminal 12. No current component from the signal source can flow through resistor 2 and back to terminal 12 due to the nonconduction of diode 5. It will be seen that this current component contributed by the signal source which flows through resistor 4 and unbalances the bridge has a direction such as to maintain point 9 positive with respect to point 11 and a D.C. meter connected thereacross will continue to read in the same direction. From the foregoing description, it should be evident that the output voltage across points 9 and 11 possesses a wave form similar to that found in full wave rectification circuits, and a D.C. voltmeter connected thereacross will read a maximum in a first or "positive" direction.

Figure 3:
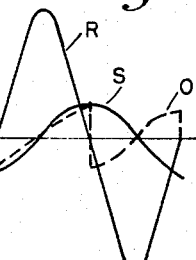
Fig. 3 illustrates the wave form of the output voltage when the reference and signal voltages are 180° out of phase.

In the case, Fig. 3, where the signal and reference voltages are 180° out of phase, it can be shown by a similar method of analysis that when the reference voltage passes through zero, going from a positive to a negative half cycle, the signal voltage which has been following the negative wave form of the signal voltage will not swing positive but continues in a negative direction, as shown by the dotted wave form "O." In this case the unbalanced current component supplied by the signal source flows alternately first through resistors 2 and then through 4 in a direction opposite to that found in the in-phase condition, and the D.C. voltmeter will give a maximum reading an opposite or "negative" direction.

Figure 4:
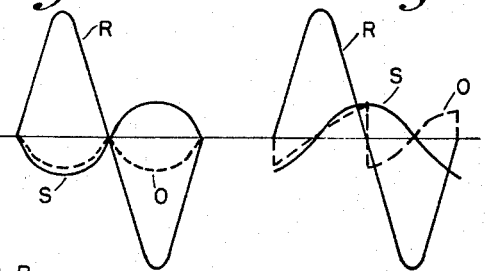
Fig. 4 illustrates the wave form of the output voltage when the reference and signal voltages are in phase quadrature.

In the quadrature phase condition, as shown in Fig. 4, the output wave form follows the input signal as it passes from a maximum negative through zero to a maximum positive during the positive half cycle of the reference voltage and, then, as the latter swings through zero on its way negative, is switched from its maximum positive value to its maximum negative value. Thereafter, it follows the amplitude of the input signal throughout the negative half cycle of the reference voltage but with an opposite sense. An inspection of the output wave form in Fig. 4 will show that it contains equal positive and negative areas, so that the D.C. voltmeter, being an averaging device, will give a zero reading.

Figure 5:
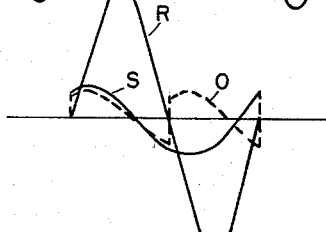
Fig. 5 illustrates the output wave form when the reference and signal voltages have an arbitrary phase relationship.

In Fig. 5 where the signal voltage leads the reference voltage by an arbitrary amount, the output voltage again follows the input signal wave form until the reference voltage passes through its zero amplitude point and switches conduction from diodes 5 and 6 to diodes 7 and 8. This reverses the direction of flow of the unbalancing current component through one of the output resistors 2 and 4 and thus the sense of the output resistors 2 and 4 and thus the sense of the output wave form. This wave form then continues to follow the amplitude of the input signal during the negative half cycle of the reference voltage. Since the positive portions of the output wave form are much greater than the negative portions, the D.C. meter will give a "positive" reading, the same as that found in the in-phase case, but with a magnitude slightly less than that indicating an in-phase condition.

From the foregoing analysis, it should be clear that the magnitude of the output voltage is completely independent of the amplitude of the reference voltage, with this last-mentioned voltage merely serving the function of a switching signal to reverse the sense of the output voltage at the point where the signal voltage may be considered out of phase with the reference signal.

It will thus be seen that the circuit of Fig. 1 gives a maximum reading in one direction for in-phase signals, a maximum reading in an opposite direction for 180° out-of-phase signals, and a zero reading for a quadrature signal relationship. The magnitude of the output voltage across points 9 and 11 very closely approximates the cosine of the phase angle between the reference and the signal voltage, and the face of the voltmeter may be calibrated accordingly.

It would be pointed out, in connection with the bridge arrangement of Fig. 1, that maximum accuracy of phase measurement is realized when the reference voltage has an amplitude considerably greater than that of the signal voltage, and when this same relationship exists between the values of resistors 2 and 4 on the one hand and resistors 1 and 3 on the other hand. The error inherent in this circuit, which can be reduced to less than one degree by following the above recommendations as to circuit parameters and voltage levels, comes about as a result of that very brief interval of time during which the reference voltage has an amplitude less than one-half of that of the signal voltage. When this voltage relationship exists, series diodes 5 and 7 or 6 and 8 will be in a conducting condition, depending on the relative signal polarities, and thereby shunt output resistors 2 and 4. In one practical embodiment of this invention, resistors $R_1$ and $R_3$ were fixed at 1,000 ohms, resistors 2 and 4 at 100,000 ohms, the reference voltage at 170 volts peak, and the signal voltage at 1.4 volts peak. The error was found to be approximately one degree.

Figure 6:
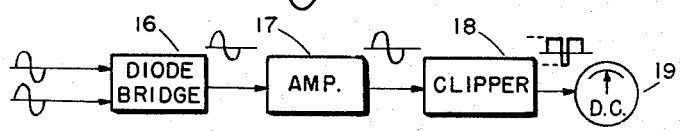
Fig. 6 is a block diagram of an embodiment of the invention which gives a linear characteristic to the phase measuring circuit.

Fig. 6 illustrates a measuring circuit employing the diode bridge arrangement of Fig. 1 in which the output voltage is altered so that its magnitude is linearly related to the phase angle between the voltages being compared. In this system the output of the diode bridge 16 is fed first to an amplifier 17 and then to a peak clipper circuit which converts the amplified output wave form of the diode bridge into a square wave. By utilizing a clipper which has equal positive and negative clipping levels, the amplitude variation in the positive and negative portions of the output signal can be eliminated. Since the length of the resultant positive and negative rectangular pulses is the only variable remaining, the average amplitude of this pulse train is linearly related to the phase simple circuit capable of performing this clipping opera-angle between the reference and signal voltages. A simple circuit capable of performing this clipping operation employs a resistor in series with a pair of oppositely poled, equally biased diodes connected across the amplifier output. The details of such a clipper can be found on pages 178 and 179 of "Ultrahigh Frequency Techniques," by Brainerd, Koehler, Reich and Woodruff, published in 1942 by D. Van Nostrand Company, Inc. The output of the clipper is fed to a D.C. voltmeter whose scale can be linearly calibrated to read the phase angle.

It should be appreciated that there are numerous equivalent circuits for the modification of Fig. 1, such as, for example, one in which transformers are substituted for the various resistors, which replacement can be utilized where any phase shifting of the output signal with respect to the signal voltage is not critical. Also, in the interests of simplicity of design, all the resistors in the diode bridge may be made of equal magnitude. Similarly, the output of the diode bridge could be converted directly to the square wave form by utilizing a mechanical chopper instead of the amplifier and limiter disclosed in Fig. 6.

Obviously many modifications and variations of the present invention are possible in the light of the above teachings. It is therefore to be understood that within the scope of the appended claims the invention may be practiced otherwise than as specifically described.

What is claimed is:

1. The method of determining the phase displacement between an alternating current signal voltage and a reference voltage of the same frequency which involves the steps of deriving from said reference and signal voltages a voltage waveform whose amplitude is proportional to that of said signal voltage and whose phase is periodically reversed from that of said signal voltage during alternate half cycles of said reference voltage and measuring the average amplitude of the voltage wave form so produced.

2. Apparatus for measuring a phase displacement between an alternating current signal voltage and a reference voltage of the same frequency which have unequal amplitudes comprising, in combination, means responsive to said voltages for generating an output voltage whose amplitude is proportional to that of said signal voltage and whose phase is periodically reversed from that of said signal voltage during alternate half cycles of said reference voltage, said condition of phase reversal commencing at times when the amplitude of said reference voltage passes through zero and means for measuring the average value of said output voltage, said average value being a cosine function of the phase displacement between said reference and signal voltages.

3. Apparatus for providing an indication of the phase displacement between a signal voltage and a reference voltage comprising, in combination, a diode bridge, said bridge being formed by four diodes which are serially interconnected, with the cathode of the first diode being connected to the anode of the second diode, the cathode of the second diode being connected to the anode of the third diode, the cathode of the third diode being connected to the anode of the fourth diode and the cathode of the four diode being connected to the anode of the first diode, a first and second series resistance connected across first opposite corners of said bridge, third and fourth series resistors connected across second opposite corners of said bridge, means for applying the reference voltage between the midpoints of said first and second resistances and the midpoints of said third and fourth resistances, means for applying said signal voltage across one pair of said opposite corners, and means for measuring the average value of the output waveform appearing across the other opposite corners of said bridge.

4. Apparatus for providing an indication of the phase displacement between a signal voltage and a reference voltage comprising, in combination, a diode bridge circuit, said bridge circuit being formed by a first, second, third and fourth diode, with the cathode of said first diode being connected to the anode of said second diode, the cathode of said second diode being connected to the anode of said third diode, the cathode of said third diode being connected to the anode of said fourth diode, the cathode of said fourth diode being connected to the anode of said first diode, a first pair of series resistors connected between the anode of said first diode and the anode of said third diode, a second pair of series resistors connected between the anode of said second diode and the anode of said fourth diode, means for applying said reference voltage to the midpoints of said series resistances, and means for indicating the average amplitude of the output waveform appearing across said second pair of series resistors, said average value being a cosine function of the phase displacement between said reference and signal voltages.

5. In combination, a diode bridge circuit, said bridge circuit having as its arm components diodes with the cathode of the first diode connected to the anode of the second diode, the cathode of the second diode connected to the anode of the third diode, the cathode of the third diode connected to the anode of the fourth diode, and the cathode of the fourth diode connected to the anode of the first diode, first and second series resistors connected across a first pair of opposite corners of said bridge, third and fourth series resistors connected across a second pair of opposite corners of said bridge, means for feeding said reference voltage between said first and second resistors and between said third and fourth resistors, means for feeding said signal voltage across said first and second resistors, means for amplifying the waveform appearing across said third and fourth resistors, means for coupling said amplified waveform to a peak clipper, said peak clipper having equal positive and negative clipping levels, and means for measuring the average value of the output of said peak clipper.

6. Apparatus of the type defined in claim 5 wherein said first and second resistors have equal amplitudes and wherein said third and fourth resistors have equal amplitudes.

7. In apparatus of the type described in claim 6 wherein the amplitude of the reference voltage is in the vicinity of two orders of magnitude greater than that of said signal voltage and wherein the same relationship exists between the magnitudes of said third and fourth resistors with respect to the magnitudes of said first and second resistors.

8. Apparatus for providing an indication of the phase displacement between an alternating current signal voltage and a reference voltage, said voltages having the same frequency, with the amplitude of said reference voltage being greater than that of said signal voltage comprising, means responsive to said voltages for developing a voltage wave form which is in and out of phase with said signal voltage during successive half cycles of said reference voltage and whose amplitude is proportional to that of said signal voltage, said out-of-phase condition commencing when the amplitude of said reference voltage passes through zero, means for converting said voltage wave form into a constant amplitude square wave, the length of the positive and negative portions of said square wave being proportional respectively to the amplitude of the positive and negative portions of said voltage wave form, and means for providing an indication of the average value of the amplitude of said square wave.

References Cited in the file of this patent

UNITED STATES PATENTS

| | | |
|---|---|---|
| 2,489,262 | Buckbee | Nov. 29, 1949 |
| 2,513,477 | Gubin | July 4, 1950 |
| 2,577,668 | Wilmotte | Dec. 4, 1951 |
| 2,686,897 | Norton | Aug. 17, 1954 |
| 2,696,582 | Willard | Dec. 7, 1954 |
| 2,716,891 | Stuart | Sept. 6, 1955 |
| 2,758,277 | Daspit | Aug. 7, 1956 |
| 2,758,278 | Adams | Aug. 7, 1956 |
| 2,774,932 | Patton | Dec. 18, 1956 |
| 2,781,489 | Petrides | Feb. 12, 1957 |

FOREIGN PATENTS

| | | |
|---|---|---|
| 513,868 | Germany | Dec. 6, 1930 |
| 888,133 | Germany | Aug. 31, 1953 |

OTHER REFERENCES

"Electronics Reference Sheet," article in Electronics, February 1954, pages 188–192.